Jan. 31, 1961
C. E. CLAFF ET AL
2,969,906
REENFORCED BOX AND BOX BLANK AND METHOD AND
MACHINE FOR MAKING THE SAME
Original Filed Jan. 15, 1957
2 Sheets-Sheet 1
Fig. 1
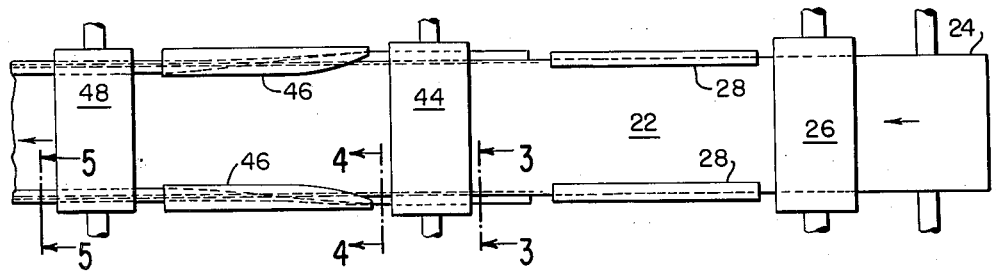
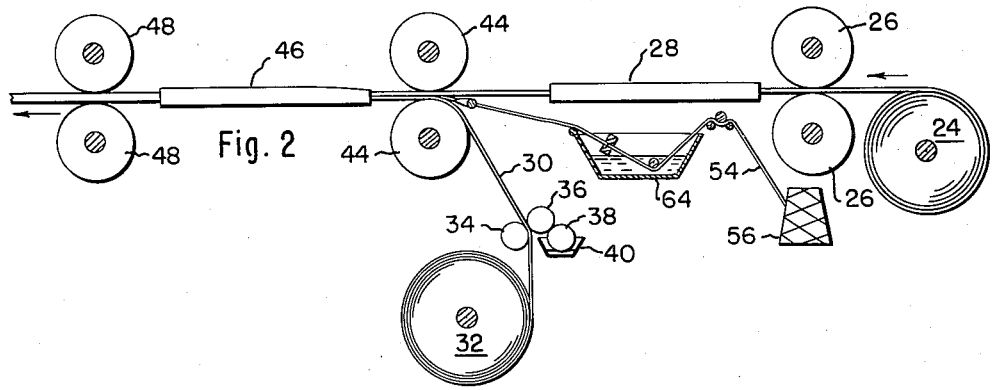
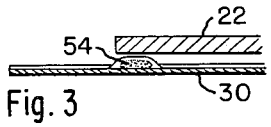
Fig. 3
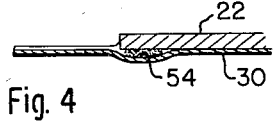
Fig. 4
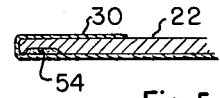
Fig. 5
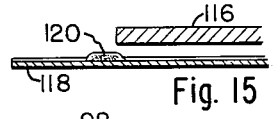
Fig. 15
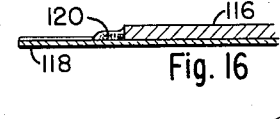
Fig. 16
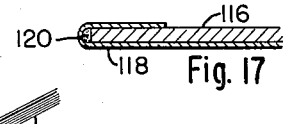
Fig. 17
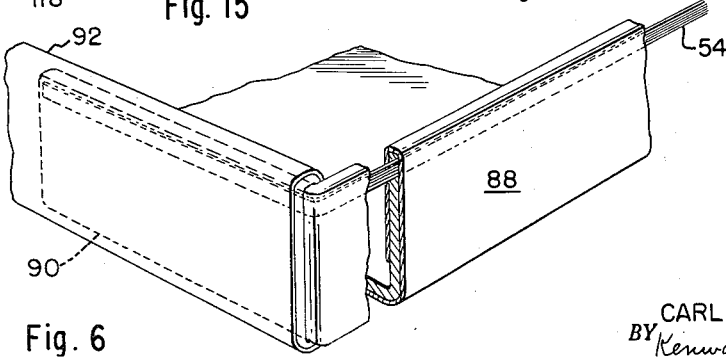
Fig. 6
*INVENTORS*
CHESTER E. CLAFF
CARL A. MOELLER
BY Kenway, Jenney, Witter
& Hildreth
ATTORNEYS

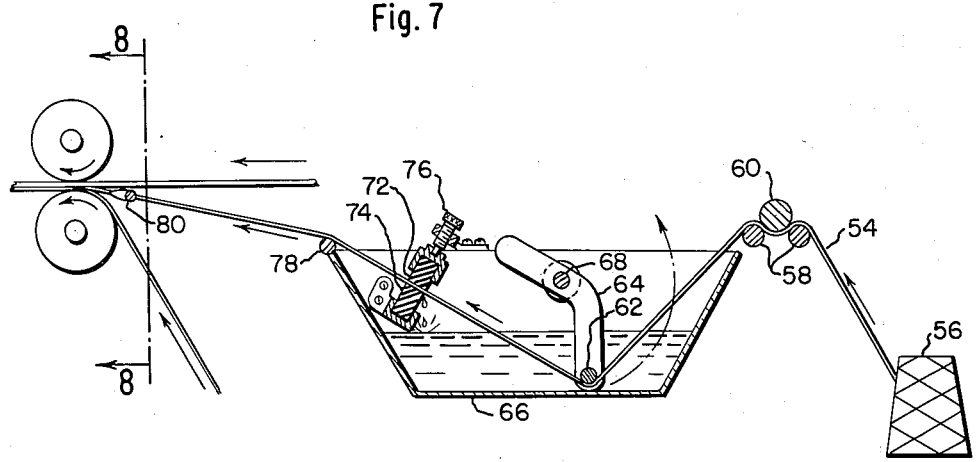
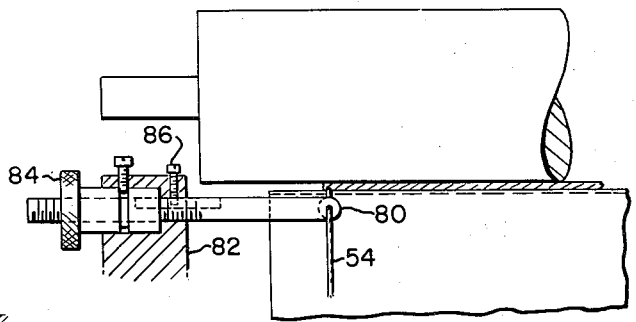
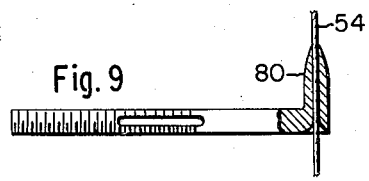
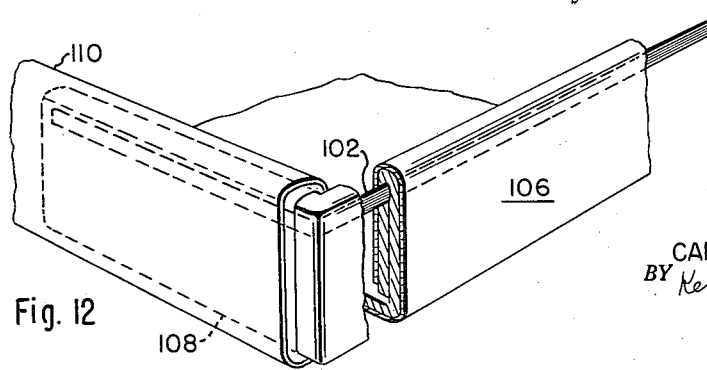

United States Patent Office 2,969,906
Patented Jan. 31, 1961

2,969,906

REENFORCED BOX AND BOX BLANK AND METHOD AND MACHINE FOR MAKING THE SAME

Chester E. Claff and Carl A. Moeller, Randolph, Mass., assignors to M. B. Claff & Sons, Inc., Randolph, Mass., a corporation of Massachusetts Continuation of application Ser. No. 634,248, Jan. 15, 1957. This application Nov. 24, 1959, Ser. No. 856,636

5 Claims. (Cl. 229—50)

The present invention relates to the manufacture of boxes or cartons from pasteboard or the like and more particularly to a reenforced box and the blank from which it is formed and to the method and machine for producing the reenforced blank.

This application is a continuation of copending application Serial No. 634,248, filed January 15, 1957, now abandoned.

Some types of boxes or cartons, such, for example, as boxes in which shoes are customarily packed and stored on the shelves of a retail store, are subjected to considerable strain in use. This is due to the practice of drawing the box outward from a stack by inserting one or more fingers downwardly within the box or upwardly under the cover and pulling against the front wall of the box or cover. Inasmuch as the boxes of this type are generally stored in high stacks, often the box that is desired is in the middle or near the bottom of the stacks. Since the only practical manner that the box may be removed is as described above, where there is any appreciable weight on the box being removed, pulling the box out causes a heavy stress on the corners of the box or cover. Often this causes the corners to tear, resulting in a box or cover that is unsightly or unusable. This is a matter of concern to such persons as retail shoe dealers whose inventory is often stored where the public may see the shoe boxes. However, more important perhaps is the necessity to replace torn boxes with new ones to make it possible to store the inventory properly.

The problem of reenforcing cardboard boxes, particularly shoe boxes, has been recognized before, and there have been many attempts to solve it. One of the commonest procedures is to apply an additional layer or strip of kraft paper or similar strong paper in the region of or around the edge of the box blank. Though some increase in tear resistance is obtained, it is considerably less than might reasonably be expected, and not as much as desired. It has also been proposed that a twisted cord or string may be laid along or adjacent the edge of the blank under the cover paper so as to provide added strength. However, this too has been only partially successful, as it is found that the ends of the string pull out due to lack of anchoring, so that only moderate increase in resistance to tearing is obtained.

In providing corner reenforcing for boxes and cartons, not only must the increase in strength be substantial in order to justify the extra expense of the materials and the added step of incorporating the reenforcing means, but also the reenforcing must not add appreciably to the wall thickness nor affect the finished appearance. It would therefore appear that very thin but strong material might advantageously be used for reenforcing, provided it could be readily applied and effectively anchored. On this basis, nylon or other synthetic fiber might be expected to provide the tensile strength coupled with small cross-section, so as to make possible effective reenforcement without objectionable thickness.

Tests conducted with nylon and rayon fibers as the reenforcement, however, failed to show the expected increase in resistance to tearing at the corners. The anchoring of the fibers proved to be particularly difficult, yet unless the fibers were effectively anchored so as not to slip past the cardboard, the fibers added practically nothing to the strength of the box.

The present invention is therefore concerned, as a principal object, with the utilization and effective anchoring of fibers or strands of strong synthetic materials such as nylon, rayon or the like so that marked improvement in the resistance to tearing of the box edges and particularly the corners may be obtained.

More specifically, it is an object of the invention to provide a novel and effective reenforcement which may readily be embodied in the box blank during fabrication and which involves appreciably less thickness than usual reenforcing means, so as to make possible the more compact stacking of blanks for storage and shipment.

With these and other objects in view, the present invention comprises a box or a cover blank having reenforcing threads effectively secured to the edges of the sides and ends adjacent the corners of the box or cover blank so as to provide strong reenforcement of the corners against tearing. A machine for automatically producing box blanks so reenforced is likewise a feature of the invention.

Another feature of the invention involves the method of making and the provision of a machine for producing such reenforced blanks rapidly and economically, so that the advantages of the improved blanks and boxes may be made available at little if any extra cost.

In the accompanying drawings illustrating the present invention,

Fig. 1 is a top plan view of apparatus for assembling web and reenforcing material for use in subsequent manufacture of shoe cartons and the like.

Fig. 2 is a view in side elevation of the appartus shown in Fig. 1.

Fig. 3 is a sectional detail taken on the line 3—3 of Fig. 1 and showing the relative positions of the cardboard, reenforcement, and cover paper prior to the time when the cover paper is pressed against the cardboard.

Fig. 4 is a sectional detail taken on the line 4—4 of Fig. 1 showing the parts after passing between the pressure rolls.

Fig. 5 is a sectional detail taken on the line 5—5 of Fig. 1 showing the edge of the assembled web after the cover paper has been folded around the free edge of the cardboard.

Fig. 6 is an oblique detail, partly in section, showing the corner portion of a completed box cover illustrating the location of the reenforcement.

Fig. 7 is a side elevation, partly in section, of the apparatus for supplying and treating the reenforcing means according to the present invention.

Fig. 8 is a detail view in partial section of the mechanism adjacent the assembly point of reenforcement and cardboard, showing the guide means for the reenforcing fibers.

Fig. 9 is a detail view, partly in section, of the guide means of the present invention.

Fig. 10 is a detail sectional view of an edge of a web creased for making a cover blank having a double-thickness side wall, prior to folding, showing the position of the reenforcing thread.

Fig. 11 is a detail sectional view of the web of Fig. 10 after the side wing extension has been folded over, showing the position of the reenforcing thread.

Fig. 12 is an oblique view taken similarly to Fig. 6 showing the corner portion of a completed cover having a double thickness side wall and incorporating the reenforcing means according to Figs. 10 and 11 of the present invention.

Figs. 13 and 14 are views illustrating the reenforcement disposed at the top edge of a double side wall box.

Figs. 15, 16, and 17 are views illustrating the steps of placing the reenforcing fibers at the top edge of a box.

The machine illustrated in Figs. 1 and 2 of the drawings may be of the same general configuration as that shown in U.S. Patent No. 2,712,342, issued July 5, 1955 to C. L. Claff, C. E. Claff and C. A. Moeller. In that machine, composite webs of cardboard and cover paper are assembled for use in blank making apparatus to which the web may be supplied as part of a continuous process. In view of the complete illustration and description of such laminating machine in said prior patent, only so much of said machine will be described herein as is necessary for an understanding of the features of the present invention. The web of cardboard 22 is supplied from a roll 24, from which it is drawn by the power driven feed rolls 26. From the feed rolls 26 the web of cardboard passes through the edge guides 28 which guide and align the web preparatory to the covering operation.

The web of covering paper 30 is supplied from a roll 32 located below the cardboard. As the web of cover paper 30 is drawn from its supply roll it passes between a guide roll 34 and glue roll 36. The glue roll 36 is in contact with a roll 38 which is partially immersed in a tank or trough 40 containing a suitable liquid gluing agent such as vegetable starch glue with a tapioca starch, a corn starch, or a potato starch base. The glue-coated cover paper is then drawn up to pressure rolls 44 where the cover paper and cardboard web are combined under pressure.

After the pressure rolls 44, the combined web passes through edge folding devices or plows 46 by which the projecting margins of the cover paper are folded over onto the other face of the cardboard. Final assembling pressure for the web is provided by the second set of pressure rolls 48.

The machine so far briefly described resembles that of Patent No. 2,712,342. The mechanism for handling the reenforcing fibers and their mode of incorporation in the composite web will now be described.

As has been indicated, the reenforcement is preferably of high strength synthetic fibers such as nylon or rayon. These may be in the form of a thread having a small amount of twist (of the order of two turns per foot) but it has been found still more effective to make use of a bundle of substantially parallel fibers not twisted. Such a bundle of zero-twist fibers will tend to flatten out when applied to the web so as to form a very thin strip only a few fibers thick, so as to add no appreciable bulk to the finished blank. By way of example, a fiber bundle may consist of approximately 960 fibers of the order of 2200 denier.

The synthetic fibers such as nylon and rayon, if directly assembled into contact with the freshly glued surface of the cover paper prior to assembly with the cardboard, exhibit but little adhesion. It has therefore been found, as an essential feature of the invention, that the fibers must be pretreated prior to assembly in the web.

The treating and supplying of the thread to the web machine is illustrated schematically in Figs. 2 and 7. The bundle of fibers, conveniently termed a thread 54, is drawn from the supply cone 56. The thread is passed over a pair of bars 58 and under an intermediate tensioning rod 60. To provide the proper pretreatment, the thread then passes under a guide 62 at the end of arm 64 so as to carry the thread beneath the surface of the treating solution within tank 66. The arm 64 is mounted on a shaft 68 and so may be rotated to bring the end with the guide above the surface of the tank. When it is necessary to re-thread the machine the arm is rotated to lift the guide out of the solution and permit easy threading.

After passing under the guide 62 the thread is drawn through means for removing excess solution. This comprises a rubber block 72 supported by a frame 74, the block having a slit to receive the thread. The slit may be adjusted by a pressure screw 76 so that it will act as a metering device to control the amount of removal of adhesive from the thread. Also it provides enough tension so that the thread will be supplied uniformly to the assembly point. An advantage of the rubber block with slit for the fiber bundle is that it permits knots in the thread to pass through.

The treated thread then passes over a guide roll or rod 78 and into the adjustable thread guide 80. The thread guide 80 is supported on a bracket 82 and is adjustably mounted laterally of the direction of web feed. Since it is essential to strengthen the top edge of the cardboard to obtain the maximum amount of reenforcement, it is important that the thread guide 80 be capable of accurate adjustment so that the thread will be brought into contact with the cardboard at the proper position. Thumb nut 84 and lock screws 86 are provided for positioning and securing the guide. The guide is shaped with a tapered tip so that it extends well into the bite between the cardboard and the cover paper. As a result, the fibers are effectively guided into precise alignment with the web edge and are thereupon flattened out along the outer edge of the cardboard between the glue-coated cover paper and the cardboard as the assembly passes between the pressure rolls.

As discussed above, it is essential that the synthetic thread be suitably treated prior to the time it is fed into contact with the cardboard and the glue-coated cover paper. This is necessary since the thin film of glue or adhesive on the cover paper is ineffective to bond the fibers. If, however, the multiple fiber synthetic thread, such as nylon or rayon, is first impregnated with a suitable adhesive, it becomes possible to provide a reenforcing means that is vastly superior to previously known materials and techniques.

In order to provide a satisfactory adhesive it is necessary to provide an agent that has an affinity for all the materials that are being anchored together: cardboard, cover paper, vegetable glue or other commonly used bonding material, and the synthetic fibers. A suitable adhesive agent that has been found to have the necessary properties is a water emulsion of polyvinyl acetate resin. The thread is preferably passed through the tank 66 in a loose state so that all the fibers will have an opportunity to become impregnated with the adhesive. As a means of insuring complete wetting of all the fibers a small amount of a wetting agent, such as the salts of homologous series of substituted aromatic sulfonic acids (for example, "Santomerse" manufactured by Monsanto Chemical Co.), is added to the adhesive agent in the tank 66. The wetting agent and the adhesive agent cooperate to impregnate thoroughly the individual fibers, thereby making possible an effective and permanent bond between the thread, cardboard, cover paper, and glue used with the cover paper. Passage of the fiber bundle through the slit in the rubber block 72 serves to meter the amount of adhesive on the thread and aids in insuring the impregnation of all the fibers. In this manner the thread comes to the assembly point at pressure rolls 44 thoroughly impregnated with an adhesive that will bond to all of the elements that are anchored together.

As the cardboard 22, adhesive impregnated thread 54 and the glue-coated cover paper 30 approach the pressure rolls 44 the position of the three elements is as shown in Fig. 3. Fig. 4 shows their relative position after they have been pressed together by the rolls 44. After passing through the rolls the web assembly passes through plows 46 shaped to turn over the projecting margins of the cover paper around the edges of the cardboard and onto the top marginal surface of the cardboard. Then the combination passes under the second set of pressure rolls 48 which press the elements forcibly together to complete the web assembly, the marginal portion of which is shown in Fig. 5.

After the elements have been secured together the web is advanced to the conventional creasing, slitting and severing mechanisms for producing box or cover blanks of conventional form. A box cover made from such a reenforced blank is shown in Fig. 6. Side wings 88 which are turned up to form the sides of the cover, with the side wing extensions turned inwardly to form corner laps 90 joining the upstanding end wings 92 and inturned end wing extensions. As may be seen in Fig. 6, the thread or fiber bundle 54, flattened into a strip, reenforces the areas where the greatest stress is placed on the cover when it is in use. Since all of the individual fibers are impregnated with adhesive and firmly anchored to the cardboard and cover paper, it is necessary to break the thread before the corner will give way. Thus all of the tensile strength of the thread is employed as a reenforcing means to prevent the box or cover from tearing or breaking.

A further advantage that is gained from the use of synthetic multiple fibers flattened out over the surface at the edge of the cover or box blank is that such reenforcement adds very little thickness to the blanks. This is of great importance since a larger number of box blanks may be stored in a given place, and smaller sized shipping cases may be used at a saving in cost. Also, the blanks provide a better printing surface, resulting in less wear on the rubber blankets of offset printing presses and improved printing quality, and avoids the blistering of the cover paper over the cord or thread, such as sometimes encountered when conventional reenforcing materials are employed.

The reenforcement of the invention may likewise be employed in conjunction with boxes of the double side wall type. The apparatus for accomplishing this may be the same as heretofore described, with suitable adjustment of the guide so that the thread or fiber bundle 102 is laid on the cardboard web adjacent the outer longitudinal fold line 104, as illustrated in Fig. 10. In order that the reenforcement may lie within the folded side wall, as shown in Fig. 11, the thread is laid on the side of the cardboard opposite to the cover paper. The disposition of the flattened fiber bundle within the side wall 106 and around the corner lap 108 into the end 110 of the box cover is apparent in Fig. 12.

As an alternative to the placement shown in Figs. 10, 11 and 12 in the double side wall embodiment, the reenforcing fibers may initially be guided into the inside of the fold line 112 for the double side wall, according to Fig. 13. This places the fiber bundle between the cardboard web and the cover paper, as in the first described embodiment.

The position of the reenforcement when the folding of the side walls is completed is shown in Fig. 14, wherein the thread 114 is at the top edge of the wall, directly beneath the cover paper. While such position is logically the most effective location to prevent the inception of tearing at the corners, it has heretofore proved difficult to obtain, due to inability to anchor the thread positively in the desired location.

This same highly advantageous location of the reenforcing fibers is likewise possible in boxes having a single side wall thickness. As shown in Figs. 15, 16 and 17, just before assembly of the cardboard body stock 116 and cover paper 118 occurs, the bundle of reenforcing fibers 120 may be laid accurately on the cover paper so as to lie immediately adjacent the edge of the cardboard. Upon folding the margin of cover paper around the cardboard, the fibers are compacted into a firm bundle supported on the edge of the cardboard. With the setting of the adhesive, the fibers become secured to the cardboard so that the assembly of cover paper, longitudinal fibers and cardboard provide great resistance to the inception of tearing, in the exact region where reenforcement is most effective.

With the pre-treatment of the fiber bundle prior to incorporation in the cardboard and cover paper assembly, coupled with the use of synthetic fibers of great strength, it is now possible to anchor the fibers not only against longitudinal slippage but also against lateral separation. As a consequence, the location of reenforcing fibers even at the top edge of the cardboard walls becomes practical and effective.

It is to be noted that the invention contemplates the use of a bundle of a multiplicity of synthetic fibers, either having a slight twist (up to about two turns per foot) but preferably having zero-twist. It has been found that the parallel fibers of the zero-twist bundle permit better penetration of the pre-treating adhesive and consequently a more effective final bond in the cardboard and cover paper assembly. Furthermore, the untwisted bundle permits flattening into a thin band to a greater degree than even a slightly twisted bundle. As a consequence, the zero-twist bundle will generally be found to provide even better anchoring and greater reenforcing value than the twisted bundle, though the latter still permits a substantial improvement over prior reenforcing procedures and is therefore comprehended within the invention.

Thus it may be seen that the present invention represents a substantial improvement over the prior methods of reenforcing box and cover blanks. While the present invention has been illustrated and described in various advantageous embodiments, it will be appreciated by those skilled in the art that the method and apparatus involving preliminary treatment of synthetic fibers is applicable to other modes and arrangements of reenforcement for boxes and box blanks within the scope of the appended claims.

Having thus described the invention what we claim is:

1. A box blank comprising a web of cardboard having a longitudinally extending side wall portion and an integral corner lap at one end of the side wall portion, the web having a marginal edge extending along the side wall portion and corner lap, a layer of cover paper folded over said marginal edge, edge and corner reenforcing means including a multiplicity of fine synthetic fibers extending along said web in overlying relation thereto and disposed closely adjacent to the marginal edge surface of the blank and between the web and cover paper, a vegetable starch base first adhesive disposed on the surface of the cover paper next adjacent the side wall portion and corner lap and bonding the cover paper to the web, and a second adhesive of a type other than a vegetable starch base adhesive bonding the fibers to said marginal edge surface and bonding the fibers to the first adhesive on the portion of the cover paper overlying the fibers, said second adhesive further anchoring said fibers against lateral separation, said second adhesive being compatible with said first adhesive and said fibers and said web.

2. A box blank comprising a web of cardboard having a longitudinally extending side wall portion and an integral corner lap at one end of the side wall portion, the web having a marginal edge extending along the side wall portion and corner lap, a layer of cover paper folded over said marginal edge, edge and corner reenforcing means including a bundle of fine synthetic fibers having a twist of from zero up to approximately two turns per foot of length of the bundle, the bundle of fibers being disposed along and in overlying relation to the marginal edge surface of the blank and beneath the cover paper, a vegetable starch base first adhesive disposed on the surface of the cover paper next adjacent the side wall portion and corner lap and bonding the cover paper to the web, and a second adhesive of a type other than a vegetable starch base adhesive bonding the bundle to said marginal edge surface and bonding the bundle to the first adhesive on the portion of the cover paper overlying the bundle, said second adhesive further anchoring said fibers against lateral separation, the bundle conforming to and filling the region intermediate the cover paper and said marginal edge of the web.

3. In a pasteboard box and the like of a type including a side wall, an integral corner lap at one end of the side wall and extending angularly of the side wall, an end wall disposed at least partially in overlapping relation to said corner lap, the side wall and the corner lap having a contiguous outer edge surface, and a layer of cover paper folded over said outer edge surface and extending along and overlying the side wall and corner lap surfaces bordering said outer edge surface along at least a portion of said side wall and a contiguous portion of said corner lap; the improvement of the combination of a multiplicity of synthetic fibers disposed closely adjacent said outer edge surface and extending along the side wall and corner lap and disposed between the cover paper and the side wall and corner lap, a vegetable starch base first adhesive covering the surface of the cover paper next adjacent the side wall and corner lap and said fibers and bonding the cover paper to the side wall and corner lap, and a second adhesive of a type other than a vegetabale starch base adhesive covering said multiplicity of fibers and bonding said multiplicity of fibers to the side wall and corner lap and to the first adhesive on the overlying cover paper, said second adhesive being compatible with said fibers and said first adhesive and the side wall and corner lap material.

4. In a pasteboard box and the like of a type including a side wall, an integral corner lap at one end of the side wall and extending angularly of the side wall, an end wall disposed at least partially in overlapping relation to said corner lap, the side wall and the corner lap having a contiguous outer edge surface, and a layer of cover paper folded over said outer edge surface and extending along and overlying the side wall and corner lap surfaces bordering said outer edge surface along at least a portion of said side wall and a contiguous portion of said corner lap; the improvement of the combination of a multiplicity of synthetic fibers extending along and in overlying relation to said outer edge surface and disposed between the cover paper and the side wall and corner lap, a vegetable starch base first adhesive covering the surface of the cover paper next adjacent the side wall and corner lap and said fibers and bonding the cover paper to the side wall and corner lap, and a second adhesive of a type other than a vegetable starch base adhesive bonding the fibers to said outer edge surface of the side wall and corner lap and to the first adhesive on the overlying cover paper, said second adhesive being compatible with said fibers and said first adhesive and the side wall and corner lap material and anchoring the fibers against lateral separation.

5. In a pasteboard box and the like of a type including a side wall, an integral corner lap at one end of the side wall and extending angularly of the side wall, an end wall disposed at least partially in overlapping relation to said corner lap, the side wall and the corner lap having a contiguous outer edge surface, and a layer of cover paper folded over said outer edge surface and extending along and overlying the side wall and corner lap surfaces bordering said outer edge surface along at least a portion of said side wall and a contiguous portion of said corner lap; the improvement of the combination of a bundle of fine synthetic fibers overlying said outer edge surface and extending along the side wall and corner lap and disposed between the cover paper and said outer edge surface, the bundle of fibers having a twist of from zero to approximately two turns per foot of length of the bundle, a vegetable starch base first adhesive covering the surface of the cover paper next adjacent the side wall and corner lap and said bundle and bonding the cover paper to the side wall and corner lap, and a second adhesive of a type other than a vegetable starch base adhesive covering said bundle and bonding the bundle to said outer edge surface and to the first adhesive on the overlying cover paper, said second adhesive being compatible with the fibers of said bundle and said first adhesive and the side wall and corner lap material and anchoring the fibers of said bundle against lateral separation, said bundle of fibers conforming to and filling the region between the cover paper and said outer edge surface.

References Cited in the file of this patent

UNITED STATES PATENTS

| | | |
|---|---|---|
| 900,904 | Wyman | Oct. 13, 1908 |
| 905,806 | Fraser | Dec. 1, 1908 |
| 1,762,704 | Smith | June 10, 1930 |
| 2,646,914 | Claff | July 28, 1953 |
| 2,732,121 | McGovern | Jan. 24, 1956 |